United States Patent [19]

Binsack et al.

[11] 4,382,131
[45] May 3, 1983

[54] THERMOPLASTIC BLOCK COPOLYESTERS, A PROCESS FOR THEIR PRODUCTION AND THEIR USE FOR THE PRODUCTION OF MOULDINGS

[75] Inventors: Rudolf Binsack; Karl-Heinz Köhler, both of Krefeld; Leo Morbitzer, Cologne; Ludwig Bottenbruch, Krefeld; Walter Heitz, Kirchhain, all of Fed. Rep. of Germany

[73] Assignee: Bayer Aktiengesellschaft, Leverkusen, Fed. Rep. of Germany

[21] Appl. No.: 329,175

[22] Filed: Dec. 10, 1981

[30] Foreign Application Priority Data

Dec. 19, 1980 [DE] Fed. Rep. of Germany ....... 3047990

[51] Int. Cl.$^3$ .................... C08F 283/00; C08F 283/02
[52] U.S. Cl. ...................................... 525/445; 525/63; 528/272; 528/303

[58] Field of Search .................. 525/63, 445; 528/272, 528/303

[56] References Cited

U.S. PATENT DOCUMENTS

| | | | |
|---|---|---|---|
| 3,598,882 | 8/1971 | Brinkmann et al. | 525/445 |
| 3,600,460 | 8/1971 | Brinkmann et al. | 525/445 |
| 3,705,208 | 12/1972 | Nakamuta et al. | 528/272 |
| 4,327,198 | 4/1982 | Weemes et al. | 525/445 |

*Primary Examiner*—Lucille M. Phynes
*Attorney, Agent, or Firm*—Connolly and Hutz

[57] ABSTRACT

Block copolyesters based on polyalkylene terephthalates which contain polyene blocks show an extremely low deformation even when they are processed into thin articles. They still have a crystallinity which is decreased by less than the ratio corresponding to the polyene portion.

10 Claims, No Drawings

THERMOPLASTIC BLOCK COPOLYESTERS, A PROCESS FOR THEIR PRODUCTION AND THEIR USE FOR THE PRODUCTION OF MOULDINGS

This invention relates to thermoplastic block copolyesters which are suitable for the production of low distortion, but highly crystalline mouldings, to a process for the production of these block copolyesters from: (a) reactive polyene derivatives; (b) dicarboxylic acids or their reactive derivatives; and (c) diols, and to the use of these thermoplastic block copolyesters for the production of mouldings, primarily injection mouldings.

By virtue of their valuable technological properties for example rigidity, hardness, abrasion-resistance, dynamic strength and thermal stability, thermoplastic polyesters have acquired increasing significance as starting materials for the production of the fibres and as resin components for moulding compositions. Polyesters based on terephthalic acid, ethylene glycol, 1,4-butane diol or 1,4-dimethylol cyclohexane are widely used by virtue of their crystallinity.

However, an undesirable property of these polyesters is their tendency towards distortion. Distortion primarily affects thin mouldings (particularly noticeable in the case of glass-fibre reinforcement) and seriously restricts the use of the polyesters. It has already been proposed to reduce distortion by the addition of aromatic polyesters (German Offenlegungsschrift No. 30 02 814, European Patent Application No. 0 012 505) or fillers, but it was found that this could only be done at the expense of a reduction in crystallinity which was at least proportional to the size of the addition, but in many cases even higher. In other words, distortion could only be avoided at the expense of a certain deterioration in the most important property affecting the desirability of the polyesters, namely their crystallinity. Accordingly, there is a need for a method which enables the distortion of thermoplastic crystalline polyesters to be reduced whilst leaving their crystallinity substantially intact, in other words the reduction in crystallinity is intended to be at most proportional to the size of the addition, but preferably lower.

A measure of the reduction in crystallinity is the relative crystallinity defined by the following quotient:

$$\frac{\text{enthalpy of fusion of the modified polyester}}{\text{enthalapy of fusion of the unmodified polyester}}$$

wherein the enthalpy of fusion is measured in both cases during a second heating period the first standardised heating stage followed by a standardised cooling stage and a standardised second heating stage, for example at a rate of 20° C. per minute, ensures the uniformity of the pretreatment) and based on the unmodified polyester as standard (relative crystallinity=1).

If for example an addition of 30% of pigment reduced the enthalpy of fusion of a polybutylene terephthalate from 51 J/g to 31 J/g, this reduction would be overproportional because the relative crystallinity would amount to 31/51=0.608 and would only be proportional for an addition of 39.2% of pigment.

It has now been found that, even when they are processed into thin mouldings, block copolyesters based on polyalkylene terephthalates containing polyene blocks show extremely low distortion and, at the same time, a crystallinity which, by comparison with the crystallinity of the unmodified polyalkylene terephthalate, decreases by less than the ratio corresponding to the polyene component.

The present invention provides block copolyesters having a relative viscosity (as measured in phenol/o-dichlorobenzene—ratio by weight 1:1—at 25° C.) of from 1.15 to 3.0 and preferably from 1.3 to 2.5, which, disregarding the terminal groups, consists of (A) from 1 to 60% by weight, preferably from 10 to 50% by weight and, more particularly, from 21 to 40% by weight, based on the block copolyester, of long-chain units corresponding to the following formula:

and/or

and/or

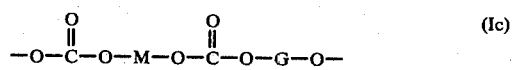

and (B) from 40 to 99% by weight, preferably from 50 to 90% by weight and, more particularly, from 60 to 79% by weight, based on the block copolyester, of short-chain units corresponding to the following formula

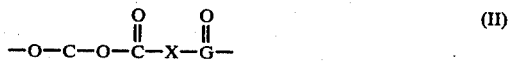

characterised in that

M is a difunctional polymethylene radical containing terminal bonding sites and having an average molecular weight $\overline{M}_n$ of from 400 to 5000, preferably from 450 to 3000 and, more particularly, from 500 to 1200; any side chains present must be methyl and/or ethyl groups and the polydiene radical on which the polymethylene radical is based contains at least 50 mole percent and preferably at least 70 mole percent of 1,4-bonds, G is a difunctional aliphatic radical containing from 1 to 12 carbon atoms and/or a difunctional cycloaliphatic radical containing from 6 to 12 carbon atoms and having a molecular weight of less than 300, at least 70 mole percent of G consisting of one and the same radical, X is a direct bond or a difunctional aliphatic, cycloaliphatic and/or aromatic radical containing from 1 to 14 carbon atoms and having molecular weight of less than 300, at least 70 mole percent of X consisting of 1,4-phenylene radicals.

In the context of the invention, "terminal groups" are monofunctional radicals which emanate from the starting compounds used and which, together with the partial structures Ia, Ib and/or Ic and II, form the macromolecule of the block copolyester according to the invention but do not themselves contain any of the partial structures Ia to Ic and II.

The "long-chain unit" A is the residue of a hydrogenated reaction product of (a) a hydroxyl-terminated polydiene with a dicarboxylic acid or a reactive derivative thereof, cf. formula Ia;

(b) a carboxyl-, alkylcarboxy, cycloalkylcarboxy-benzylcarboxy- or arylcarboxy-terminated polydiene with a diol, cf. formula Ib;

(c) an alkyl carbonate- cycloalkyl carbonate-, benzyl carbonate- or aryl carbonate-terminated polydiene with a diol, cf. formula Ic.

The present invention also provides a process for the production of block copolyesters having a relative viscosity (as measured in phenol/o-dichlorobenzene—ratio by weight 1:1—at 25° C.) of from 1.15 to 3.0 and preferably from 1.3 to 2.5, characterised in that 1. hydroxyl-, carboxyl-, alkyl carboxy-, cycloalkyl carboxy-, benzyl carboxy-, aryl carboxy-, alkyl carbonate-, cycloalkyl carbonate-, benzyl carbonate-or aryl carbonate-terminated polymethylenes, the polymethylene radical containing terminal bonding sites and having an average molecular weight $\overline{M}_n$ of from 400 to 5000, preferably from 450 to 3000 and, more particularly, from 500 to 1200; any side chains present must be methyl and/or ethyl groups and the polydiene radical on which the polymethylene radical is based contains at least 50 mole percent and preferably at least 70 mole percent of 1,4-bonds, are transesterified or esterified with 2. at least one dicarboxylic acid derivative corresponding to the following formula:

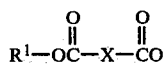

in which $R^1$ and $R^2$ represent a hydrogen atom or a $C_1$-$C_{10}$-alkyl radical and X is as previously defined, and 3. at least one diol corresponding to the following formula

in which

G is as previously defined, followed by polycondensation until the required viscosity is reached, the quantities in which the starting components are used being selected such that, disregarding the terminal groups, the block copolyester obtained contains from 1 to 60% by weight, preferably from 10 to 50% by weight and, more particularly, form 21 to 40% by weight of long-chain units corresponding to formula Ia, Ib, and/or Ic and from 40 to 90% by weight, preferably from 50 to 90% by weight and, more particularly, form 60 to 79% by weight of shortchain units corresponding to formula II.

The present invention also provides the use of these block copolyesters for the production of mouldings, particularly injection mouldings.

The polyene derivatives preferably used for producing the block copolyesters according to the invention are hydrogenated derivatives of polybutadiene, polyisoprene, polychloroprene and poly-2,3-dimethyl butadiene. They contain two terminal reactive groups. Polyene derivatives of this type are known and may be produced by bulk polymerisation in the presence of radical-forming initiators, for example dialkyl peroxydicarbonates or azodicarboxylic acid esters, followed by hydrogenation (German Offenlegungsschrift Nos. 29 00 880 and 29 08 298). The polyenes containing terminal hydroxyl groups may be produced from the polyenes containing terminal carbonate ester groups by hydrolysis or from the polyenes containing terminal carboxylic acid ester groups by reduction of the ester group.

The average molecular weights of the polyene components are determined by vapour pressure osmometry in benzene.

Diols HO—G—OH preferably used for producing the block copolyesters according to the invention are ethylene glycol 1,3-propane diol, 1,4-butane diol, 1,6-hexane diol and cyclohexane-1,4-dimethanol.

Dicarboxylic acids HOOC—X—COOH preferably used for producing the block copolyesters according to the invention or dicarboxylic acids on which the preferred dicarboxylic derivatives $R^1OOC$—X—$COOR^2$ are based are oxalic acid, malonic acid, succinic acid, glutaric acid, adipic acid, pimelic acid, azelaic acid, sebacic acid, particularly cyclohexane dicarboxylic acids for example, cyclo-hexane-1,4-dicarboxylic acid and adipic acid.

One particularly preferred class of dicarboxylic acids are the aromatic dicarboxylic acids, examples of which are isophthalic acid, terephthalic acid, diphenyl- 1,4-dicarboxylic acid, bis-(p-carboxyphenyl)-methane, naphthalene-1,5- and -2,6-dicarboxylic acid.

The most preferred diols are ethylene glycol and 1,4-butane diol. The most preferred dicarboxylic acid is terephthalic acid.

The polyene units M and the dicarboxylic acid units

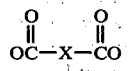

used for producing the block copolyesters according to the invention are incorporated in the block copolyester in the molar proportions in which they are used in the reaction mixture. Even when it is present in excess in the reaction mixture, the diol HO—G—OH is chemically incorporated in the block copolyester in an equimolar ratio to the sum of the dicarboxylic acid derivatives $R^1OOC$—X—$COOR^2$ and the polyene dicarboxylic acid HOOC—M—COOH used or as the equimolecular difference between the dicarboxylic acid derivatives $R^1OOC$—X—$COOR^2$ and the polyene-diol HO—M—OH or polyene dicarbonate ester used. Where mixtures of diols HO—G—OH are used, the proportion of diols incorporated depends upon the boiling points and relative reactivities of the diols.

Preferred block copolyesters according to the invention are the reaction products of terephthalic acid (dimethyl ester), 1,4-butane diol or ethylene glycol and the diols, dicarboxylic acids, dicarboxylic acid dialkyl ester or dicarbonates of hydrogenated polybutadiene, hydrogenated poly-2,3-dimethyl butadiene, hydrogenated polychloroprene and hydrogenated polyisoprene.

The block copolyesters according to the invention may contain as terminal groups (based in each case on the partial structures Ia to Ic and II) hydroxyl, O—C-$1$-$C_{10}$-alkyl in the carbonyl position: hydrogen in the hydroxy position and alkyl or cycloalkyl containing from 1 to 12 carbon atoms in the carbonate position.

The viscosity of the block copolyesters according to the invention may be measured, for example, in an Ub-belohde viscometer.

The block copolyesters according to the invention may be produced by the processes normally used for producing thermoplastic polyesters. Accordingly, the first reaction step is a transesterification step where the esters of the dicarboxylic acid and polyene dicarboxylic acid are used or an esterification step where the free dicarboxylic acids are used. Esterification and transesterification may also be combined in the first stage of the reaction, namely when both dicarboxylic acid esters and also free dicarboxylic acid are used. The first stage of the reaction (transesterification or esterification) is followed by normal polycondensation at elevated temperatures and reduced pressure.

It has proved to be advantageous initially to react the polyene derivative used with an excess of dicarboxylic acid (diester $R^1OOC-X-COOR^2$ where polyene diols or polyene dicarbonate esters are used and with an excess of diol $HO-G-OH$ where polyene dicarboxylic acid (diesters) are used.

To increase the molecular weight of the block copolyesters obtained when polycondensation is carried out in the melt, it may be advisable to include a solid phase polycondensation stage of the type known for thermoplastic polyesters. To this end, the block copolyester is normally heated at a temperature of from 5° to 50° C. below its melting point either in an inert gas stream or in vacuo until the required molecular weight is attained.

The block copolyesters according to the invention have extremely high melting points, based on the polyene component. Moreover, they are distinguished, as mentioned above, by surprisingly high crystallinity which is reflected in an only slightly reduced melting temperature and the enthalpy of fusion of the crystalline fractions.

The block copolyesters according to the invention may be modified in conventional manner. They may contain, for example, reinforcing materials and fillers, flameproofing agents, stabilisers, nucleating agents, lubricants and mould-release agents as well as dyes and pigments.

The reinforcing materials and fillers which are used for increasing rigidity and strength are employed in the usual quantities of from 5 to 40% by weight, based on the sum of block copolyester and additives. For example, it is possible to use kaolin, quartz, mica, wollastonite, talcum, titanium dioxide, aluminium oxide, preferably glass fibres.

Suitable flameproofing agents are the compounds normally used for thermoplastic polyesters, i.e. for example organic halo-compounds, such as deca- and octabromodiphenyl, tetrabromobisphenol polycarbonate. Another flameproofing agent acting as a synergist, preferably antimony trioxide, is generally used. The quantities in which the flameproofing agents are used generally amount to between 10 and 25% by weight, based on the sum total of the constituents.

The block copolyesters according to the invention may be processed into a variety of different mouldings, for example coachwork components, by the injection moulding and extrusion processes normally used for thermoplastic moulding compositions.

EXAMPLES

Production of polytetramethylene dicarboxylic acid dimethyl ester

The polytetramethylene dicarboxylic acid dimethyl ester used in the following Examples was produced by the bulk polymerisation of butadiene in the presence of azoisobutyric acid methyl ester, followed by catalytic hydrogenation in tetrahydrofuran solution in the presence of palladium carbon in accordance with German Offenlegungsschrift No. 20 00 880. The products obtained have average molecular weights $\overline{M}_n$ of 750 (type A) and 1200 (type B) and contain 78 mole percent of 1,4-bonds (type A) and 80 mole percent of 1,4-bonds (type B). Production of polymethyl tetramethylene dicarboxylic acid dimethyl ester:

Production was carried out in the same way as described above for the polytetramethylene dicarboxylic acid dimethyl ester. The product obtained had an average molecular weight $\overline{M}_n$ of 900 and contained 76 mole percent of 1,4-bonds (type C).

The molecular weights of A, B and C are number averages $\overline{M}_n$ and are determined by vapour pressure osmosis in benzene. Production of the block copolyesters:

EXAMPLES 1 to 4

The following reaction components were reacted under nitrogen for 1 hour at 200° C. in a reaction vessel equipped with a stirrer and with a distillation attachment:

100.9 parts by weight of 1,4-butane diol

Y parts by weight of polytetramethylene dicarboxylic acid dimethyl ester, type A, and 0.092 part by weight of titanium tetra-isopropylate.

After the elimination of methanol had ceased, 155.3 parts by weight of dimethyl terephthalate were added to the reaction mixture.

Thereafter the reaction mixture was stirred under nitrogen for 3 hours at 200° C., methanol distilling off. The temperature of the reaction mixture was then increased over a period of 30 minutes to 250° C. whilst at the same time the pressure prevailing in the reaction vessel was reduced from normal pressure to around 0.5 Torr. The reaction mixture was stirred under these conditions for 40 minutes, the viscosity of the melt undergoing a considerable increase towards the end of the reaction. The block copolyester obtained was spun off into water, size-reduced and, after drying, was injection-moulded at 250° C. to form standard small test bars.

The melting temperature and heat of fusion of the crystalline fractions of the block copolyester were determined by differential thermoanalysis (DSC-method). The results are set out in Table 1:

TABLE 1

| Example No. | Polytetramethylene dicarboxylic acid dimethyl ester type A | | Block copolyester | | Enthalpy of fusion [J/g][4] |
|---|---|---|---|---|---|
| | Y[parts of weight] | % by weight[1] | rel. viscosity[2] | Mp [°C.][3] | |
| 1 | 9.5 | 5.3 | 1.49 | 224 | 50 |
| 2 | 20 | 10.5 | 1.43 | 224 | 49 |
| 3 | 44 | 20.6 | 1.34 | 221 | 45 |
| 4 (Comparison) | — | — | 1.48 | 225 | 51 |

[1]based, as ester component, on the total block copolyester;
[2]as measured at 25° C. in an ubbelohde viscometer in phenol/o-dichlorobenzene (1:1 part by weight);
[3]maximum of the main melting temperature as measured by the DSC method during the second heating stage;
[4]total heat of fusion as measured by the DSC-method during the second heating stage.

EXAMPLES 5 TO 7

Production and methods as in Examples 1 to 4; type B was used instead of type A.

TABLE 2

| Example No. | Polytetramethylene dicarboxylic acid dimethyl ester, type B | | Block copolyester | | Enthalpy of fusion [J/g] |
|---|---|---|---|---|---|
| | Y[parts by weight] | % by weight | rel. viscosity | Mp. [°C.] | |
| 5 | 9.5 | 5.2 | 1.44 | 225 | 51 |
| 6 | 20 | 10.4 | 1.43 | 225 | 50 |
| 7 | 44 | 20.3 | 1.33 | 224 | 42 |

EXAMPLES 8 AND 9

Production and methods as in Examples 1 to 4; type C was used instead of type A.

TABLE 3

| Example No. | Polymethyl-tetramethylene dicarboxylic acid dimethyl ester, type C | | Block copolyester | | Enthalpy of fusion [J/g] |
|---|---|---|---|---|---|
| | Y[parts by weight] | % by weight | rel. viscosity | Mp. [°C.] | |
| 8 | 35.0 | 16.9 | 1.40 | 223 | 46 |
| 9 | 60.0 | 25.9 | 1.38 | 219 | 41 |

We claim:

1. Block copolyesters having a relative viscosity (as measured in phenol/o-dichlorobenzene, ratio by weight 1:1—at 25° C.) of from 1.15 to 3.0 and, disregarding the terminal groups, consisting of:

(A) from 1 to 60% by weight, based on the block copolyester, a long-chain units corresponding to the following formula

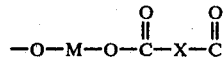  (Ia)

and/or

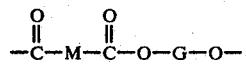  (Ib)

and/or

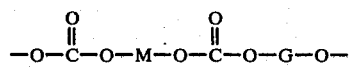  (Ic)

and (B) from 40 to 99% by weight, based on the block copolyester, of short-chain units corresponding to the following formula

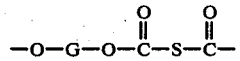  (II)

characterised in that

M is a difunctional polymethylene radical containing terminal bonding sites and having an average molecular weight $\overline{M}_n$ of from 400 to 5000; any side chains present must be methyl and/or ethyl groups and the polydiene radical on which the polymethylene residue is based contains at least 50 mole percent of 1,4-bonds, G is a difunctional aliphatic radical containing from 1 to 12 carbon atoms and/or a difunctional cycloaliphatic radical containing from 6 to 12 carbon atoms and having a molecular weight below 300, at least 70 mole percent of G consisting of one and the same radical, X is a direct bond or a difunctional aliphatic, cycloaliphatic and/or aromatic radical containing from 1 to 14 carbon atoms and having a molecular weight below 300, at least 70 mole percent of X consisting of 1,4-phenylene radicals.

2. Block copolyesters as claimed in claim 1, characterised in that they have a relative viscosity of from 1.3 to 2.5.

3. Block copolyesters as claimed in claim 1, characterised in that they consist of:
from 10 to 50% by weight of long-chain units A and from 90% to 50% by weight of short-chain units B.

4. Block copolyesters as claimed in claim 1, characterised in that M has an average molecular weight $M_n$ of from 450 to 3000.

5. Block copolyesters as claimed in claim 1, characterised in that M has an average molecular weight $M_n$ of from 500 to 1200.

6. Block copolyesters as claimed in claim 1, characterised in that the polydiene radical on which the polymethylene radical M is based contains at least 70 mole percent of 1,4-bonds.

7. Block copolyesters as claimed in claim 1 characterised in that X is a 1,4-phenylene radical.

8. Block copolyesters as claimed in claim 1, characterised in that G is an ethylene or 1,4-butylene radical.

9. A process for producing the block copolyesters claimed in claim 1, characterised in that (a) hydroxyl-, carboxyl-, alkylcarboxy-, cycloalkyl carboxy-, benzylcarboxy-, arylcarboxy-, alkyl carbonate-, cycloalkyl carbonate-, benzyl carbonate- or aryl carbonate- terminated polymethylenes;
in which the polymethylene radical contains terminal bonding sites and has an average molecular weight $\overline{M}_n$ of from 400 to 5000 (preferably from 450 to 3000, more particularly from 500 to 1200); any side chains present must be methyl and ethyl groups and the polydiene radical on which the polymethylene radical is based contains 50 mole percent (and preferably at least 70 mole percent) of 1,4-bonds, are transesterified or esterfied with (b) at least one dicarboxylic acid derivative corresponding to the following formula:

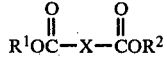

in which $R^1$ and $R^2$ represent a hydrogen atom or a $C_1$–$C_{10}$-alkyl radical and X is as defined above, and (c) at least one diol corresponding to the following formula:

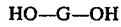

in which

G is as defined above, followed by polycondensation until the required viscosity is reached, the quantities in which the starting components are used being selected such that, disregarding the terminal groups, the block copolyester obtained contains from 1 to 60% by weight of long-chain units corresponding to formulae Ia, Ib and/or Ic and from 40 to 99% by weight of short-chain units corresponding to formula II.

10. A molding produced from a block copolyester of claim 1.

* * * * *

UNITED STATES PATENT AND TRADEMARK OFFICE
CERTIFICATE OF CORRECTION

PATENT NO. : 4,382,131
DATED : MAY 3, 1983
INVENTOR(S) : BINSACK ET AL

It is certified that error appears in the above-identified patent and that said Letters Patent is hereby corrected as shown below:

Column 2, line 36, the formula should read:

$$\text{-- -O-G-O-}\overset{\overset{O}{\|}}{C}\text{-X-}\overset{\overset{O}{\|}}{C}\text{- --}$$

Column 7, line 61, the formula should read:

$$\text{-- -O-G-O-}\overset{\overset{O}{\|}}{C}\text{-X-}\overset{\overset{O}{\|}}{C}\text{- --}$$

Signed and Sealed this

Eighteenth Day of October 1983

[SEAL]

Attest:

GERALD J. MOSSINGHOFF

Attesting Officer     Commissioner of Patents and Trademarks